United States Patent Office 2,704,247
Patented Mar. 15, 1955

2,704,247

METHOD OF MAKING LOW CARBON STEEL

William G. Connor, Tarentum, Pa., assignor to Allegheny Ludlum Steel Corporation, Pittsburgh, Pa., a corporation of Pennsylvania No Drawing. Application November 13, 1950, Serial No. 195,489

7 Claims. (Cl. 75—12)

This invention relates to a method of making low carbon steel in either an open hearth or an electric furnace, in which a substantial portion of the heat employed in the steel-making operation is produced by the chemical reaction between materials delivered to the melt or molten bath formed during the steel-making operation.

An object of the invention is to produce an improved method of making low carbon steel.

A further object is to produce an improved method of manufacturing low carbon alloy steel in which at least a portion of the heat utilized in refining the molten bath or melt within the furnace is developed by a chemical reaction taking place between materials delivered to the furnace after the initial charge has been either partially or wholly refined.

A further object is to produce and refine a melt of steel in an electric furnace and under conditions such as to minimize carbon pick-up from the furnace electrodes during the steel-making procedure.

These and other objects are attained by a procedure in which elements having a high chemical affinity for each other and which occasion a marked exothermic reaction, are delivered to the furnace during the steel-making operation. To be more specific, I accomplish the objects of my invention by employing a procedure in which the initial charge delivered to the furnace is or may be melted in accordance with ordinary steel mill procedure. After the initial charge is melted or partially melted I deliver to the molten bath a substance, which at elevated temperatures has a high affinity for oxygen. I then blow the bath with gaseous oxygen, thus creating within the furnace a vigorous exothermic reaction which develops sufficient heat within the bath to accomplish or contribute to the incorporation in the metal of the bath of such alloying constituents as are essential to the production of the particular steel being produced.

As an example of carrying out my invention I briefly outline the operation of producing a stainless steel which includes as alloying constituents substantial amounts of chromium and nickel, together with lesser amounts of other alloying constituents. The procedure is outlined as carried forward in an electric furnace.

The initial charge preferably of selected scrap steel, lime, limestone, mill scale or iron ore, is delivered to the furnace and is melted down in accordance with usual practice. After the charge is melted, and preferably after it has been refined to the extent that the carbon content thereof is reduced to and preferably below 0.020% and the phosphorus content is below 0.010%, I reduce or shut off the power to the furnace, remove the slag covering the melt and deliver onto the bare surface of the melt an element which, under the temperature conditions existing within the furnace, will rapidly unite with oxygen to produce a vigorous exothermic reaction. I then deliver to the furnace the alloying addition or additions in the form of substantially pure metals or in the form of metallic alloys such, for example, as ferrous alloys of extremely low carbon content and in which the desired alloying constituent constitutes a substantial, if not the major portion of the alloying addition. After the delivery of the alloying addition, I blow the melt with oxygen in an amount sufficient to fully react the heat-producing material and in this way develop sufficient heat to melt and incorporate in the melt the desired alloying constituent or constituents.

I have discovered that metallic aluminum may be effectively employed with gaseous oxygen to develop an exothermic reaction of sufficient intensity to create suitable temperature conditions within the melting zone of the furnace to accomplish the alloying of the melt. By way of example it is noted that the oxidation of one pound of aluminum at about 2900° F. produces 24300 B. t. u. Oxidation of one pound of silicon at about the same temperature produces 12000 B. t. u. When it is realized that 560 B. t. u. are required to melt one pound of steel and raise it to a temperature of 2900° F., a rough calculation will disclose that a ton of steel can be melted by the oxidation of about 46 pounds of aluminum or by the oxidation of a little more than twice that amount of silicon. From this it is apparent that the amount of materials employed to create the necessary exothermic reaction may be calculated and proportioned to the existing conditions, so as to accomplish the desired result.

Where metallic aluminum is employed as the exothermic reaction reagent, it is preferably delivered into the melt or onto the bare surface thereof, in the form of aluminum pig. In the production of a chrome-nickel steel alloy the nickel may be, and preferably is delivered to the melt in the form of substantially carbon-free electrolytic nickel and the chromium in the form of low carbon ferrochromium or chrome-silicide which is a composition containing about 33% chromium and about 50% silicon, with the remainder iron. As soon as the nickel and chromium additions are charged into the furnace I cover the bath with slag-producing material, preferably lime, in sufficient amount to cover any ferrochromium which may project above the surface thereof. By employing lime on the bath I prevent carbon pick-up from the action of the arc when power or full power is again delivered to the furnace. Immediately after the metallic aluminum, the nickel and the chromium are charged into the melt I introduce gaseous oxygen into the melt through at least one pipe, the delivery end of which is submerged below the surface of the melt. The pressure, the rate of delivery and the duration of the delivery of the oxygen are proportioned in accordance with previous calculations in order to fully oxidize the aluminum and produce sufficient heat within the melt to incorporate the nickel and the chromium as constituents of the bath.

After the exothermic reaction is completed the power may be, and preferably is again turned on or increased and the furnace retained under normal operating conditions long enough to totally reduce the slag on the melt. Where manganese or other alloying constituents are to be included in the finished steel, they may be added in accordance with usual procedure, i. e., after the final slag has been formed on the melt.

My former comparison of the heating effect of aluminum and silicon, discloses that silicon may be employed in place of aluminum for accomplishing the results here defined. It will, however, be apparent that where silicon is employed as a substitute for aluminum, about twice as much silicon will be necessary to accomplish the desired results. It will, of course, be apparent that where chrome-silicide is employed as an additive to the melt, the silicon content of that composition will create an exothermic reaction which will be extremely vigorous in the presence of gaseous oxygen.

In the production of chrome-nickel alloy steel in which the chromium constitutes from 16% to 18% of the alloy and the nickel from 10% to 14%, I have found it desirable to deliver the alloying material to the melt in two distinct steps, each accompanied by a separate exothermic reaction. Where the finished steel is also to include a substantial amount of molybdenum (3%–4%) the procedural steps employed in carrying out my invention may be defined as follows:

1. Charging the furnace with selected scrap, molybdenum oxide and iron ore.

2. Melt the charge under usual electric furnace conditions while delivering iron ore and limestone to the charge.

3. Continue the delivery of power to the furnace while refining the charge and reducing carbon content to less than 0.020% and the phosphorus content to less than 0.010%.

4. Cut off the power to the furnace or materially reduce it, remove the slag and clean the surface of the molten bath.

5. Deliver the selected reaction reagent into the melt or onto the bare surface thereof in the calculated amount necessary to melt the entire nickel addition and half the chromium addition. If metallic aluminum is utilized as the heat-producing reagent, it is preferably delivered to the melt in the form of aluminum pig. The entire nickel addition may then be delivered to the melt in the form of substantially carbon-free electrolytic nickel and one-half the chromium addition may be delivered in the form of ferrochromium having a low carbon content (0.03% maximum). The aluminum pig can be added to the melt by plunging it below the surface thereof by means of delivery rods, or it may be delivered to the bare surface of the melt. The aluminum pig should be as nearly carbon-free as possible.

6. The nickel is preferably, but not necessarily, charged ahead of the chromium and after the chromium is introduced the melt is covered with lime in sufficient quantities to cover such ferrochromium as may be protruding above the surface of the molten bath.

7. Gaseous oxygen is then introduced into the bath, the amount, time and the rate of delivery having been previously determined so as to completely oxidize the aluminum and thereby develop sufficient heat to effectively incorporate the nickel and the chromium in the melt.

8. After the oxygen blow, full power is again delivered to the furnace and the slag on the melt is thoroughly reduced under normal furnace operating conditions, sufficient additions of lime and grained aluminum or other reducing reagent such as ferrosilicon being employed to accomplish the reduction.

9. The power to the furnace is again decreased or completely shut off and aluminum pig is again delivered to the furnace in a sufficient amount to melt the remainder of the chromium addition. During this operation the aluminum pig must be plunged into the body of the bath by means of delivery rods, in order to avoid burning the slag off the melt.

10. The second addition of low carbon ferrochrome is then delivered to the melt. This is also submerged under the slag.

11. Gaseous oxygen is again delivered to the melt and in sufficient quantities to fully oxidize the previously delivered aluminum pig.

12. After the exothermic reaction is completed, the delivery of oxygen is shut off and the normal amount of power is again delivered to the furnace. The slag on the melt is then thoroughly reduced under normal electric furnace operating conditions.

13. Manganese in the form of electrolytic maganese may then be delivered to the melt and after thoroughly mixing, a sample of the steel taken.

14. The final additions of alloying materials are then made to the melt in order to properly adjust the amount of each alloying constituent in the finished product.

15. The furnace is then tapped.

It will, of course, be apparent to the skilled steelmaker that I have merely outlined the principal steps employed in carrying out my procedure in an electric furnace. He will realize that as occasion demands, slag may be run off, ore may be delivered, and that usual adjustments and deliveries may be made to the furnace in order to maintain the slag and the bath itself, in the desired condition. The delivery of electric power to the furnace may be wholly shut off during the preparation for the thermal reaction occasioned by the delivery of gaseous oxygen to the melt, or the power delivery may be reduced a substantial amount so that the heat energy delivered to the melt during the exothermic reaction merely augments that produced by the delivery of current to the furnace.

It will also be understood that the outline of my procedure is set forth by way of illustration rather than by way of limitation, it being understood that the principal feature of my invention is that I supplement the delivery of energy to the furnace by creating an exothermic reaction within the melt and I utilize the heat thus developed in maintaining the temperature of the melt while the alloying addition or additions are added, melted and incorporated in the melt. In this way I am able to produce high quality, low carbon steel (0.025% and lower) and similarly low carbon alloy steels while reducing the time of completing a heat and also reducing the amount of electric power employed. As to the time of completing the heat, it is noted that the gaseous oxygen is delivered to the melt, in each of the deliveries designated in the above tabulation, at a rate such that the metallic aluminum previously delivered is completely oxidized in not substantially more than ten or twelve minutes. This not only produces heat where it is most effectively employed, but also minimizes the chance for carbon pick-up from the electrodes of the furnace.

While I have described my invention in connection with the production of low carbon alloy steel in which chromium and nickel are the principal alloying constituents of the steel, it will, of course, be apparent that the procedure here outlined may be employed in the production of low carbon steel per se or low carbon alloy steel in which any one or more of the usual alloying metals may be introduced into the melt in the form of low carbon metals or metallic alloys and incorporated therein while the melt is receiving heat occasioned by the complete oxidation of a reagent, such as metallic aluminum, during the delivery of gaseous oxygen to the melt.

What I claim is:

1. A method of making low carbon steel, which consists in melting down a charge containing steel-making and slag-producing ingredients in an electric furnace powered by carbon electrodes; refining the resulting melt to materially reduce the carbon content thereof; cutting off the power to the furnace; deslagging the melt and delivering metallic aluminum thereto; covering the melt with slag-producing material; then blowing the melt with gaseous oxygen to completely oxidize such metallic aluminum; and then delivering full power to the furnace and fully reducing the slag on the melt.

2. A method of making low carbon steel in an electric furnace powered by carbon electrodes, which consists in melting down a charge consisting of steel making and slag producing materials, under the heat developed by power delivered to such furnace by such electrodes; refining the melt under the power so delivered to reduce the carbon content of the melt below 0.020% and the phosphorus content below 0.010%; materially reducing the power delivered to the furnace; delivering a thermal reaction reagent and an alloying addition in metallic form to the melt; blowing the melt with gaseous oxygen to oxidize said reagent and to incorporate said addition in the melt under the heat so generated; and then increasing the power delivered to the furnace while reducing the slag on the melt.

3. A method of making low carbon steel in an electric furnace equipped with and powered by carbon electrodes, which consists in delivering to the furnace a charge consisting of steel making and slag producing materials; melting down such charge under heat developed by power delivered to such furnace by such electrodes; refining the melt so formed to reduce the carbon content thereof below 0.020% and the phosphorus content below 0.010% under heat developed by power so delivered to the furnace; shutting off the power to the furnace; deslagging the melt; delivering to the melt a determined quantity of an alloying addition in metallic form and a calculated amount of thermal reaction reagent capable of producing sufficient heat to incorporate such addition into the melt; then blowing the melt for about 10 minutes with a sufficient quantity of gaseous oxygen to substantially completely oxidize said reaction reagent and to thereby incorporate said addition in the melt while the power is shut off to the furnace; and then delivering power to the furnace and reducing the slag on the melt under the power so delivered.

4. A method of making low carbon steel in an electric furnace equipped with and powered by carbon electrodes, which consists in delivering to the furnace a charge consisting of steel making and slag producing materials; melting down such charge under heat developed by power delivered to such furnace by such electrodes; continuing the delivery of power to the furnace while so refining the melt so formed as to reduce the carbon content thereof below 0.020% and the phosphorus content below 0.010%; cutting off the delivery of power to the furnace; removing slag from and cleaning the surface of said melt; delivering to the melt a determined quantity of at least one alloying addition in metallic form and a calculated amount of a thermal reaction reagent selected from the group containing metallic aluminum and silicon; covering the melt with slag producing material; blowing the melt for from about 10 to about 12 minutes with a sufficient quantity of gaseous oxygen to completely oxidize the reagent and incorporate such additions into the melt under the heat so generated; then delivering sufficient power to the furnace to substantially reduce the slag within the furnace; and then tapping the furnace under the heat produced by the power so delivered.

5. A method of making low carbon steel in an electric furnace powered by carbon electrodes which consists in delivering to such furnace a charge consisting of steel making and slag producing materials; delivering power to the furnace to melt such charge and to so refine the resulting melt that the carbon content thereof is reduced to less than 0.020% and the phosphorus content thereof is reduced to less than 0.010%; cutting down the delivery of power to the furnace; removing the slag from and cleaning the surface of the melt; delivering to the melt a predetermined quantity of at least one alloying addition and a calculated amount of a thermal reaction reagent, selected from the group containing metallic aluminum and silicon in the form of a ferrous alloy, in an amount sufficient, when oxidized, to incorporate such addition in the melt; covering the surface of the melt with a slag producing material; blowing the melt for a period of from about 10 to about 12 minutes with a sufficient quantity of gaseous oxygen to completely oxidize said reagent; then delivering increased power to the furnace and completing the melt by reducing the slag within the furnace under the power so delivered; and then tapping the furnace under the heat resulting from power delivered to the furnace.

6. A method of making low carbon steel in an electric furnace equipped with and powered by carbon electrodes, which comprises delivering to such furnace a charge consisting of steel making and slag producing materials; melting down and refining the charge so produced under power delivered to the furnace by such electrodes; reducing the power delivered to the furnace to the extent of cutting off the same; deslagging the furnace; delivering thereto a predetermined quantity of an alloying addition in metallic form and a calculated amount of aluminum pig sufficient, when oxidized, to incorporate said addition in the melt within the furnace; delivering sufficient lime to the surface of the melt to cover the same and the aluminum pig delivered thereto; blowing the melt with sufficient oxygen to completely oxidize such aluminum; cutting off the blow and delivering full power to the furnace while completing the melt and reducing the slag; and then tapping the furnace under heat resulting from power delivered thereto.

7. A method of making low carbon steel in an electric furnace equipped with and powered by carbon electrodes, which consists in delivering to such furnace a charge consisting of steel making and slag producing materials; delivering power to the furnace to melt such charge and to so refine the resulting melt that the carbon content thereof is reduced to less than 0.020% and the phosphorus content thereof is reduced to less than 0.010%; shutting off the delivery of power to the furnace; removing the slag from and cleaning the surface of the melt; delivering to the melt as alloying addition a predetermined quantity of metallic nickel and a predetermined quantity of low carbon ferrochromium and a calculated amount of metallic aluminum sufficient, when oxidized, to incorporate such additions in the melt; covering surface of the melt with lime; blowing the melt for a period of about 10 minutes with a sufficient quantity of gaseous oxygen to completely oxidize the aluminum and to effectively incorporate the nickel and the chromium in the melt under the heat so developed; delivering full power to the furnace while reducing the slag on the melt; again shutting off the power to the furnace; delivering a predetermined quantity of low carbon ferrochrome to the melt and a sufficient quantity of metallic aluminum to effectively incorporate chromium of such addition in the melt under heat developed by the oxidation of such aluminum; delivering gaseous oxygen to the melt in sufficient quantities to fully oxidize such metallic aluminum; shutting off the flow of oxygen; delivering full power to the furnace while reducing the slag within the furnace; and then tapping the melt under the heat resulting from power so delivered to such furnace.

References Cited in the file of this patent

UNITED STATES PATENTS

| 1,756,054 | Crum | Apr. 29, 1930 |
| 2,207,109 | Perrin | July 9, 1940 |
| 2,374,396 | Urban | Apr. 24, 1945 |
| 2,455,073 | Loveless | Nov. 30, 1948 |

OTHER REFERENCES

"Electric Furnace Steel Proceedings, 1948, page 129. Published by A. I. M. E., 29 W. 39th Street, New York.